United States Patent [19]
Schmidt et al.

[11] Patent Number: 4,596,019
[45] Date of Patent: Jun. 17, 1986

[54] METHOD AND APPARATUS FOR THE GENERATION OF HOT GASES WITH AN ELECTRIC ARC

[75] Inventors: Herbert Schmidt; Richard Müller, both of Marl, Fed. Rep. of Germany

[73] Assignee: Chemische Werke Huls Aktiengesellschaft, Marl, Fed. Rep. of Germany

[21] Appl. No.: 536,432

[22] Filed: Sep. 27, 1983

[30] Foreign Application Priority Data

Sep. 29, 1982 [DE] Fed. Rep. of Germany ....... 3236037

[51] Int. Cl.⁴ ................................. H05B 7/00
[52] U.S. Cl. ................. 373/22; 219/121 PQ; 219/121 PR; 219/121 PY
[58] Field of Search ............... 373/22, 88; 219/121 P, 219/121 PQ, 121 PR, 121 PY, 121 PM, 383

[56] References Cited

U.S. PATENT DOCUMENTS

| | | | |
|---|---|---|---|
| 3,294,952 | 12/1966 | Eschenbach | 219/121 PQ |
| 3,705,975 | 12/1972 | Wolf et al. | 219/383 |
| 3,746,830 | 7/1973 | Fey et al. | 219/121 PR |
| 3,849,543 | 12/1974 | Zirngibl et al. | 373/88 |
| 3,953,705 | 4/1976 | Painter | 219/121 PR |
| 4,002,466 | 1/1977 | MacRae et al. | 373/22 |

FOREIGN PATENT DOCUMENTS 2513098  3/1975  Fed. Rep. of Germany ... 219/121 P

OTHER PUBLICATIONS

Hydrocarbon Processing and Petroleum Refining, vol. 4, No. 6, 1962, p. 159.

Primary Examiner—A. D. Pellinen
Assistant Examiner—Gregory D. Thompson
Attorney, Agent, or Firm—Antonelli, Terry & Wands

[57] ABSTRACT

In a direct-current-operated, gas-vortex stabilized high-voltage arc furnace with hollow electrodes and a vortex chamber, the gas to be heated is blown in tangentially to the common axis of the electrodes. In the hollow electrodes, the ratio of the internal diameter of the cathode to that of the anode is 1.6 to 2.5, and the spacing between the electrodes is 0.9 to 0.7 times the internal diameter of the cathode. In the method of operation of the arc furnace, the momentum flow of gas to be heated is at least 10 kg m/s², the gas entering into the vortex chamber is at a gas velocity of at least 10 m/s and pressures in the vortex chamber range from 1.5 to 10 bar (absolute).

8 Claims, 1 Drawing Figure

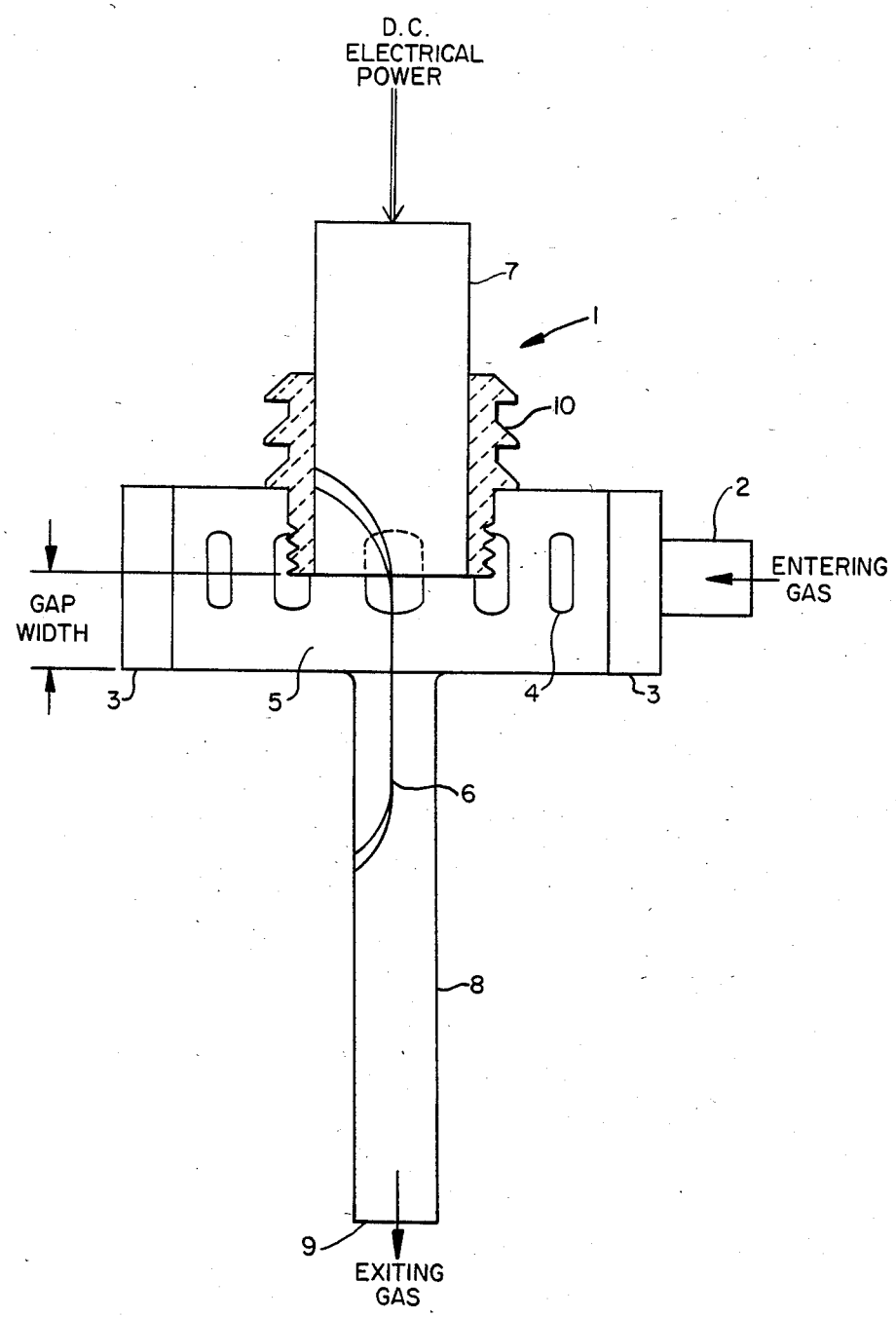

METHOD AND APPARATUS FOR THE GENERATION OF HOT GASES WITH AN ELECTRIC ARC

BACKGROUND OF THE INVENTION

The invention relates to a method and apparatus for the generation of hot gases with temperatures of above 1,600° K. for the chemical and metallurgical industry.

The invention has the purpose of rendering the heating and/or production of the gases of any desired composition, including gaseous mixtures, more economical in an electric-arc furnace.

The gases to be heated up can be of varying composition; it is possible to charge air as well as gaseous mixtures of carbon monoxide (CO) and hydrogen ($H_2$). Besides CO and $H_2$, the gaseous mixture can also consist of carbon-containing components reacting with an oxidizing medium added in suitable quantities, such as, for example, $CO_2$, $H_2O$, etc., at the prevailing temperatures and pressures, thus yielding a gaseous mixture containing predominantly CO and $H_2$. In this case, part of the energy fed to the arc is used for promoting the chemical reaction.

Such gaseous mixtures are utilized in chemical industry as synthesis gas for the manufacture of various organic compounds. In the production of metal from ores, these mixtures serve as a reduction gas.

In the classical blast furnace method, the heat for the heating process is generated in the blast furnace by burning coke with preheated air. The exhaust gas of the blast furnace is burned and the sensible heat is transferred to the air to be preheated in the blast heaters. During this step, temperatures are reached of 1,200°–1,500° K.; a technical limit lies at about 1,600° K. In contrast thereto, in the recently developed direct reducing processes, the heat for the heating-up step is produced essentially outside of the reducing process and transferred to the reduction gases. Even relatively small metallurgical plants can be operated by using this method. In this connection, utilization of electric-arc furnaces for the manufacture and/or heating up of the reduction gases may be advantageous for economical reasons. In this connection, gas temperatures can be attained of up to 3,500° K. under pressures of up to 10 bar.

Heating of certain gases, with or without chemical reactions, in an electric-arc furnace is conventional; for example, acetylene is produced from hydrocarbons on a large industrial scale in an electric-arc furnace (Hydrocarbon Processing and Petroleum Refining, 1962 Vol. 4, No. 6, 159 et seq.). In the metal-smelting industry, gaseous mixtures of CO and $H_2$ are produced and/or heated in an electric-arc furnace; also air can be heated up in an electric-arc furnace (German Pat. No. 2,413,580, corresponding to British Pat. No. 1,473,942). For this purpose, varying arc arrangements are utilized, such as, for example, gas-vortex stabilized arcs, magnetic-field stabilized arcs, and high-current arcs, as well as combinations of these arrangements. In gas-vortex stabilized arcs, the cathode and/or anode can be of rod or plate shape (U.S. Pat. No. 4,002,466). The disadvantage of this method resides in that the striking point of the arc is too greatly fixed on one spot of the electrode, leading to short operating lifetimes (50–100 hours) of the electrode—especially at high electrical power. Furthermore, this method can only be carried out with gaseous hydrocarbons and under pressures of below 1.5 bar (absolute) in a stable fashion.

In magnetic-field stabilized arcs, the electrodes consist, at least in the zone of the axial magnetic field, of nonmagnetizable metals, for example, copper or steel alloys (DOS No. 2,107,824 and British Pat. No. 1,351,626). The strong burnout of these electrodes can cause considerable costs for the electrodes and for the removal of the burnout products. For this reason, the gas-vortex stabilized arc furnaces with low-burnout and inexpensive electrodes have become popular for electric-arc furnaces having powers of above 6 MW. It is desirable to utilize this electric-arc furnace also for the heating up and/or manufacture of reduction gases or synthesis gases, as well as for heating up air under relatively high pressures.

In the conventional, gas-vortex stabilized high-voltage arc furnace, as utilized on a large industrial scale for acetylene manufacture, the strike points of the arc lie on large-area electrodes; thereby, an only minor burn-off occurs, resulting in lifetimes for the electrodes of 1,000 hours and more. However, this known arc arrangement can be operated in a stable fashion only with gaseous hydrocarbons and under pressures of below 1.5 bar (absolute). Changes in the composition of the gaseous mixture lead to considerable alterations in electric field strength in the longitudinal direction, affecting the arc length and, thus, the amount of gas required for vortex stabilization. At pressures of above 1.5 bar (absolute), the rotational flow of the gas, necessary for stabilizing the arc, is considerably altered. These influential variables are critical in a gas-vortex stabilized high-voltage arc having a ratio of voltage to current larger than or equal to 4 volt/ampere.

Thus, the problem presents itself of designing the gas-vortex stabilized high-voltage arc, operated with direct current, in an appropriate way and of providing process conditions making it possible to operate this furnace in a stable fashion with air, with oxygen-enriched air, or with gaseous mixures of CO, $H_2$, or gaseous hydrocarbons, as well as with $CO_2$ and/or steam under pressures of above 1.5 bar (absolute).

SUMMARY OF THE INVENTION

The problem is solved by the method of this invention having the following characterizing features:

- the momentum flow of the gas to be heated is at least 10 kg.m/s², preferably 10–30 kg.m/s²;
- the gas velocity is at least 10 m/s, preferably 10–50 m/s upon entrance of the gas into the vortex chamber; and
- the gas pressure is 1.5–10 bar (absolute), preferably 2–5 bar (absolute).

The gas or gaseous mixure to be heated is blown into the electric-arc furnace tangentially with respect to the electrode axis, preferably into a space lying between the electrodes. The reacted and/or heated gases are discharged from the electric-arc furnace—depending on their contemplated usage—either through one of the hollow electrodes—preferably through the hollow anode—or simultaneously through both hollow electrodes.

BRIEF DESCRIPTION OF THE DRAWINGS

The process of this invention is conducted by means of an apparatus as shown in the sole FIGURE of the accompanying drawings which is a longitudinal schematic cross-sectional view and is similar to the apparatus shown in greater detail in FIG. 1 on page 159 of

*Hydrocarbon Processing and Petroleum Refining*, 1962, Vol. 4, No. 6, with the exception that the apparatus of the invention has a single gas inlet. The apparatus of this invention has the following characterizing features:

in the hollow electrodes, the ratio of the internal diameter of the cathode to the internal diameter of the anode is 1.6 to 2.5; and the spacing; i.e., gap width, between the hollow electrodes is 0.7 to 0.9 times the inner diameter of the cathode.

The momentum flow is the product of the mass stream and gas velocity in the inlet slots of the vortex ring upon entering the vortex chamber.

If the momentum flow of the vortex flow surrounding the arc is above 10 kg m/s$^2$ and if simultaneously the velocity of the gaseous mixture entering the vortex chamber through the tangential slots is higher than 10 m/s, the arc can be securely stabilized under the indicated pressures.

With increased pressure, the volume flow of the gas available for stabilizing the arc is decreased, with a simultaneous rise in electric field strength in the longitudinal direction of the arc. By both effects, the length of the arc is shortened and the back vortex into the hollow cathode is weakened; thereby, the striking point on the cathode is no longer drawn into the hollow cathode, on a very small area. This leads to a very large burn-off and the lifetime of the cathode is drastically shortened to 5–10 hours.

If the ratio of internal diameter of the cathode to that of the anode lies within the indicated range, the back vortex into the hollow cathode is enhanced even under increased pressure, and the arc strike is pulled into the hollow cathode.

These measures alone are insufficient for a stable position of the arc strike on the inner wall of the hollow cathode, if the spacing between the electrodes; i.e., the gap width is too large. In contrast thereto, if the gap width dependent on the inner diameter of the hollow cathode is in the indicated range, then the arc strike lies stably on the inner wall of the hollow cathode.

Another factor, besides the penetration depth of the arc into the hollow cathode, for a long lifetime of both electrodes is also the rotational velocity of the arc strike points on both electrodes. On account of the comparatively smaller volume flow of gas at increased pressure, the rotational velocity of the gas flow, causing the rotation of the arc strike points, is reduced. Arc strike points that rotate too slowly cause increased burn-off of the electrodes. However, if the momentum flow and, simultaneously, the inlet velocity of the gas lie above the indicated minimum values, an adequately high rotational velocity of the arc strike points on the electrodes results. The rotational velocity is at an optimum if the momentum flow is 10–30 kg.m/s$^2$ and the inlet velocity of the gas is 10–50 m/s.

In order to render the above-recited measures fully effective, it is recommended to place the center of the vortex chamber with vortex ring and, thus, the gas inlet into the plane between the two electrodes. If the device generating the gas vortex is, for example, within one or both hollow electrodes, the vortex flow is disturbed, and the arc becomes less stable.

The advantages of the method of this invention, carried out by means of the described apparatus, are:

the arc burns in a stable fashion with arc strike points lying within the hollow electrodes;

the arc strike points have an optimum rotational velocity;

burn-off of the electrodes is small, and the operating life of the electrodes is long;

gas pressure can be higher than heretofore customary;

the composition of the gas is extensively arbitrary;

the gases can contain no proportions or only minor proportions of hydrocarbons.

The method of this invention, conducted by means of the heretofore described apparatus, thus makes it possible to utilize the gas-vortex stabilized high-voltage electric arc furnace with its advantageous properties for the production and/or heating of gases of an extensively arbitrary composition under increased pressures.

The method of this invention will be explained by the following example.

A high-voltage arc furnace conventional in its essential parts (as shown in the accompanying drawing) which is gas-vortex stabilized and operated with direct current and which is employed for the manufacture of acetylene from gaseous hydrocarbons, was charged with a gaseous mixture having the following composition:

| | |
|---|---|
| $CH_4$ | 22 vol % |
| CO | 18 vol % |
| $H_2$ | 37 vol % |
| $H_2O$ | 23 vol % |

The following two operating conditions were chosen for the electric-arc furnace:

| | Conventional Conditions | Conditions of Invention | |
|---|---|---|---|
| Furnace power | 8.5 | 8.5 | MW |
| Ratio of furnace voltage to furnace current | 4.6 | 4.3 | V/A |
| Gas pressure in furnace | 3 | 3 | bar |
| Ratio of inner diameters of cathode to anode | 1 | 1.8 | |
| Ratio of gap width to internal diameter of cathode | 1 | 0.85 | |
| Inlet velocity of gaseous mixture | 9 | 25 | m/s |
| Momentum flow of gaseous mixture | 8 | 15 | kg · m/s$^2$ |
| Position of vortex chamber | Within plane between electrodes | | |
| Discharge of heated gas | Through hollow anode | | |
| Temperature of gas when exiting furnace | max 3,500 | max 3,500 | K |
| Operating life of cathode | 40 | 400 | h |
| Operating life of anode | 90 | 950 | h |

Thus, with the electric arc furnace operated under the conditions of this invention, and the gaseous mixture used herein, the operating life of the electrodes is about 10 times as long as with the furnace operated under conventional conditions.

In the apparatus shown in the drawings, the gas to be heated enters the furnace 1 via an inlet 2 and then moves tangentially through a vortex ring 3 and slots 4 into a whirl or vortex chamber 5 wherein the gas is exposed to the high temperatures produced by the arc 6 generated between cathode 7 and anode 8. (The whirl chamber 5 has a diameter of 100–800 mm and a height of 50–500 mm and the slots are approximately 1×10 to 5×50 mm). The heated gas is discharged via the hollow anode 8 (15–150 mm in diameter) through the outlet 9. Both electrodes are hollow and are coaxially arranged. The inner diameter of the cathode is usually 24 to 360 mm. The striking point of the arc 6, because of the whirling motion applied to the entering gas, moves in circles and can also move up and down. Usually the arc 6 has a length of 200 cm and extends 80 to 120 cm into the anode 8. All basic parts of the furnace are made of iron except for the insulation member 10 formed of ceramic or organic insulating material. Usually the cathode 7 extends into the vortex chamber 0 to 26 cm. The furnace operates at 800 to 10,000 volts D.C. and 100 to 15,000 amperes and usually draws about 80 to 10,000 kw.

What is claimed is:

1. A method for the generation of hot gases which are under increased pressure with the use of a direct-current-operated, gas-vortex stabilized high-voltage arc furnace having hollow electrodes and a vortex chamber, which comprises feeding a gas to be heated into the vortex chamber of the furnace tangentially into an arc generated across the vortex chamber; with the momentum flow of the gas to be heated being at least 10 kg m/s$^2$, the velocity of the gas being at least 10 m/s upon entrance of the gas into the vortex chamber, and the pressures in the vortex chamber being 1.5 to 10 bar (absolute); utilizing hollow electrodes having a ratio of the internal diameter of the cathode to that of the anode of 1.6 to 2.5; providing a spacing between the adjacent ends of the electrodes amounting to 0.9 to 0.7 times the internal diameter of the cathode and discharging heated gas through at least one of the hollow electrodes.

2. A method according to claim 1, wherein the momentum flow of the gas to be heated is 10–30 kg m/s$^2$.

3. A method according to claim 2, wherein the gas velocity is 10–50 m/s.

4. A method according to claim 3, wherein the method is conducted under a pressure of 2–5 bar (absolute).

5. A method according to claim 1, wherein the gas to be heated is blown into the electric-arc furnace tangentially to the common axis of the electrodes into a space lying between the electrodes.

6. A method according to claim 1, wherein the heated gas is discharged from the electric-arc furnace through the hollow anode.

7. A method according to claim 1, wherein the heated gas is discharged from the electric-arc furnace through both hollow electrodes.

8. An apparatus for the generation of hot gases which are under increased pressure, comprising a direct-current-operated, gas-vortex stabilized high-voltage arc furnace with hollow electrodes and vortex chamber, said furnace having hollow electrodes wherein the ratio of the internal diameter of cathode to the internal diameter of the anode is 1.6 to 2.5, and the spacing between the electrodes amounts to 0.9 to 0.7 times the internal diameter of the cathode.

* * * * *